United States Patent
Kwan et al.

(10) Patent No.: US 6,478,861 B1
(45) Date of Patent: *Nov. 12, 2002

(54) LASER MARKABLE COATING

(75) Inventors: Wing Sum Vincent Kwan, Deerfield; Yoshikazu Mizobuchi, Mundelein, both of IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,901

(22) Filed: Mar. 30, 2000

Related U.S. Application Data

(63) Continuation-in-part of application No. 09/339,934, filed on Jun. 25, 1999, now Pat. No. 6,261,348.

(51) Int. Cl.$^7$ .............................. C09D 1/00; C09D 1/12
(52) U.S. Cl. ................ 106/31.14; 106/31.4; 106/31.72; 106/31.37; 106/31.69
(58) Field of Search ...................... 106/2, 31.14, 31.4, 106/31.37, 31.69, 31.72, 287.17, 287.19, 436, 450, 425, 452, 482, 401, 432; 427/372.2, 385.5, 397.7

(56) References Cited

U.S. PATENT DOCUMENTS

| | | |
|---|---|---|
| 3,161,770 A | 12/1964 | Huett et al. |
| 4,179,305 A | 12/1979 | Miller .......................... 106/292 |
| 4,571,416 A | 2/1986 | Jarzombek et al. .......... 524/474 |
| 4,605,686 A | 8/1986 | Obana .......................... 524/547 |
| 4,612,049 A | 9/1986 | Berner et al. ............. 106/14.13 |
| 4,680,332 A | 7/1987 | Hair et al. ................... 524/377 |
| 4,861,620 A | 8/1989 | Azuma et al. ............... 427/556 |
| 4,880,465 A | 11/1989 | Loria et al. ............... 106/31.13 |
| 4,880,466 A | 11/1989 | Zwarun et al. ............ 106/31.32 |
| 4,980,390 A | 12/1990 | Shorr et al. ..................... 523/1 |
| 5,063,137 A | 11/1991 | Kiyonari et al. |
| 5,472,930 A | 12/1995 | Podszun et al. |

(List continued on next page.)

FOREIGN PATENT DOCUMENTS

| | | |
|---|---|---|
| DE | 4407905 | 9/1995 |
| DE | 19652253 | 6/1998 |
| EP | 0 078 365 | 5/1983 |
| EP | 63-172689 | 7/1988 |
| EP | 0 485 181 | 5/1992 |
| EP | 0 531 584 | 3/1993 |

(List continued on next page.)

OTHER PUBLICATIONS

Translation of BA ("Laser–sensitive Pigmente im Kunststoff" *Austropak*, pp. 10–12 (1997).
U.S. Patent Application Ser. No. 09/288,017, filed Apr. 8, 1999.

*Primary Examiner*—Helene Klemanski
*Assistant Examiner*—Veronica F. Faison
(74) *Attorney, Agent, or Firm*—Leydig Voit & Mayer, Ltd.

(57) ABSTRACT

The present invention provides a transparent or colorless coating comprising a heat responsive material that increases in opacity when exposed to heat. An example of a heat responsive material is an inorganic compound or an organic resin. The present invention further provides a coating composition comprising a carrier and a heat responsive material. The coating can further include additives such as an adhesion promoter, a defoamer, a crosslinking agent, a plasticizer, a humectant, a pH adjuster, a biocide, a co-solvent, a surface tension modifier, and/or a combination thereof. The present invention further provides a method for creating a mark on a substrate comprising providing to the substrate the transparent coating to obtain a coated substrate and exposing a selected area of the coated substrate to heat, e.g., a laser, to create the mark. The present invention further provides substrates suitable for laser marking.

59 Claims, 2 Drawing Sheets

(2 of 2 Drawing Sheet(s) Filed in Color)

U.S. PATENT DOCUMENTS

| | | | |
|---|---|---|---|
| 5,486,550 A | 1/1996 | Lubas | 523/161 |
| 5,596,027 A | 1/1997 | Mead et al. | 523/161 |
| 5,662,731 A | 9/1997 | Andersen et al. | 106/206.1 |
| 5,679,145 A | 10/1997 | Andersen et al. | 106/162.5 |
| 5,711,791 A | 1/1998 | Croker et al. | 106/31.35 |
| 5,760,120 A | 6/1998 | Itoh et al. | 524/431 |
| 5,792,856 A | 8/1998 | Allen et al. | 536/66 |
| 5,821,286 A | 10/1998 | Xu et al. | 524/47 |
| 5,830,929 A | 11/1998 | Stramel | 523/200 |
| 5,868,824 A | 2/1999 | Andersen et al. | 106/162.51 |
| 5,897,938 A | 4/1999 | Shinmoto et al. | 428/354 |
| 5,990,199 A | 11/1999 | Bealing et al. | 523/161 |
| 6,013,724 A | 1/2000 | Mizutani et al. | 524/588 |
| 6,025,077 A | 2/2000 | Yamaki et al. | 428/447 |
| 6,133,342 A | 10/2000 | Mizobuchi et al. | 523/161 |
| 6,210,472 B1 | 4/2001 | Kwan et al. | |
| 6,261,348 B1 * | 7/2001 | Kwan et al. | 106/31.14 |

FOREIGN PATENT DOCUMENTS

| | | |
|---|---|---|
| EP | 0 611 662 | 1/1995 |
| EP | 0 732 358 | 9/1996 |
| EP | 0 739 933 | 10/1996 |
| EP | 0 754 562 | 1/1997 |
| EP | 09-156228 | 6/1997 |
| EP | 0 782 933 | 7/1997 |
| GB | 2 227 570 | 8/1990 |
| GB | 2 291 719 | 1/1996 |
| JP | 02 162544 | 6/1990 |
| JP | 03124051 | 5/1991 |
| JP | 03/130942 | 6/1991 |
| JP | 05 162449 | 6/1993 |
| WO | WO 94/12352 | 6/1994 |

* cited by examiner

LASER MARKABLE COATING

CROSS-REFERENCE TO A RELATED APPLICATION

This is a continuation-in-part of U.S. patent application Ser. No. 09/339,934, filed Jun. 25, 1999, now U.S. Pat. No. 6,261,348, the disclosure of which is incorporated herein in its entirety by reference.

FIELD OF THE INVENTION

The present invention generally relates to a heat responsive coating and a coating composition, and particularly, to a coating and coating composition which allow high speed marking of substrates by the use of a laser beam.

BACKGROUND OF THE INVENTION

Laser marking technology has been used to mark substrates. For example, laser marking technology makes use of laser energy focused to the surface of the substrate. Carbon dioxide lasers having a wavelength in the infrared region are generally used for this application.

At times, laser marking technology has certain advantages over other marking technologies, e.g., ink jet printing technology. For example, the maintenance of a laser equipment may be easier and more economical in certain circumstances than the maintenance of other types of markers. Since the laser marking technology does not depend on the use of an ink in a liquid state to produce a mark, it is less prone to printing problems caused by ink.

In addition, laser marking technology allows marking of substrates at extremely high speeds. An example of the use of this technology is in the marking of expiration dates on plastic soda bottles. During laser marking, the rate of movement of the conveyor carrying the soda bottles generally ranges from about 100 to about 300 feet per minute, and it can be as high as 500 feet per minute.

Although laser marking technology has advantages, substrates suitable for laser marking are presently lacking. For example, plastics such as white high density polyethylene, metals, and white or corrugated paper cannot be readily marked.

Metal surface is difficult to mark by laser marking technology as most metals have high heat conductivity and/or light reflectance values as well as high melting points. One or more of these characteristics reduce the effectiveness of the laser energy received by the metal surface during marking. In the case of corrugated paper, the laser tends to damage the surface. As regards plastics, the mark is created by the laser by altering, e.g., by melting or degrading, and the resulting surface of the plastic is generally of the same color as the plastic itself. This can lead to an inconspicuous mark.

Thus, there exists a need for substrates or substrate surfaces that are suitable for laser marking. There further exists a need for substrates or surfaces that are suitable for creating a white mark against a dark or colored background.

The advantages of the present invention, as well as additional inventive features, will be apparent from the description of the invention provided herein.

BRIEF DESCRIPTION OF THE DRAWINGS

The file of this patent contains at least one drawing executed in color. Copies of this patent with color drawing will be provided by the Patent and Trademark Office upon request and payment of the necessary fee.

BRIEF SUMMARY OF THE INVENTION

Figure 1:
FIG. 1 depicts a laser mark produced on the side of a glass bottle in accordance with an embodiment of the present invention. The mark shows the expiration date of the contents of the bottle.

Many of the foregoing needs have been fulfilled by the present invention which provides a transparent or colorless coating comprising a heat responsive material. The opacity of the coating increases when the coating is exposed to heat. Preferably, the transparent coating is free or substantially free of a colorant such as a pigment or dye. The increase in opacity is substantially irreversible. Preferably, the increase in opacity is not due to a physical change in the heat responsive material.

The present invention further provides a coating composition comprising a carrier and a heat responsive material. The heat responsive material can be an inorganic compound or an organic resin. In an embodiment of the coating composition, the heat responsive material is in solution. In another embodiment of the coating composition, the heat responsive material is in a colloidal state. The coating composition may preferably include one or more additives, for example, an adhesion promoter, a defoamer, a crosslinking agent, a plasticizer, a humectant, a pH adjuster, a biocide, a co-solvent, a surface tension modifier, or a combination thereof.

An advantage of the coating composition of the present invention is that it allows the use of water or aqueous solvents. In embodiments of the invention, the transparency of the coating is independent of the refractive indices of components of the coating, e.g., the refractive index of the heat responsive material. The coating can be a multi-layered, or preferably, a single-layered coating.

The present invention further provides a method for marking a substrate comprising providing a transparent or colorless coating to the substrate and exposing to heat a selected area of the coated substrate. The heat can be provided by, e.g., a laser beam.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention relies on the phenomenon that certain materials become opaque irreversibly when exposed to heat. Accordingly, the present invention provides a transparent or colorless coating comprising a heat responsive material that increases in opacity when exposed to heat. It is preferred that the heat responsive material becomes white, for example, as viewed by the naked eye, when exposed to heat. Preferably, the coating is free or substantially free of a colorant such as a pigment or dye.

The term "opacity" herein generally refers to the property of the mark that makes it readable by the human eye. Opacity can be determined quantitatively by any suitable method, e.g., by measuring the absorption, transmission, or scattering of light by the mark. Thus, for example, the mark can have an absorbance of about 0.01 unit or higher and preferably from about 0.1 unit or higher, for a light in the visible part of the spectrum, particularly at a wavelength of about 550 nm. Embodiments of the transparent coating have a transmittance of about 40% or more, preferably about 80% or more, and more preferably about 85% or more, at 550 nm.

Any suitable heat responsive material that undergoes a change, e.g., a chemical reaction, below a temperature of about 500° C., typically at a temperature of from about 80° C. to about 450° C., preferably at a temperature of from about 100° C. to about 450° C., and more preferably at a temperature of from about 120° C. to about 400° C., can be used as a heat responsive material. The heat responsive material can be a material of low molecular weight or high molecular weight. The heat responsive material can be organic, inorganic, or combinations thereof. The heat responsive material can be water, solvent, or oil soluble or dispersible, preferably solvent or water soluble.

As the heat responsive material is in solution, the coating composition provides an advantage that the transparency of the coating, unlike coatings made from certain compositions containing suspended or dispersed materials, is essentially independent of the refractive indices of the components of the coating. The present invention offers one or more advantages, e.g., it allows preparation of substrates with a wide range of coating components. The coating can be prepared in a wide range of thicknesses without sacrificing the aesthetic appeal of the substrate. Further, it is advantageous to coat substrates with solutions rather than dispersions, as the uniformity and stability of solutions can lead to more uniform coatings as well as manufacturing advantages.

In an embodiment, the coating composition comprises an inorganic compound in solution, preferably an inorganic compound that is soluble in water or solvent or an inorganic compound that can be solubilized, e.g., by the addition of an acid or a base, to produce a homogeneous solution.

Examples of inorganic compounds include an element of groups 2$b$, 3$a$, and 4$a$–$b$ of the periodic table, preferably an element such as silicon, zinc, aluminum, or titanium. Examples of suitable inorganic compounds include oxides, silicates, zincates, aluminates, and titanates. A preferred example of a silicate is a water-soluble silicate; a preferred example of a zincate is a water-soluble basic zincate; a preferred example of an aluminate is a water-soluble basic aluminate; and a preferred example of a titanate is a solvent-soluble titanate. Further examples of titanates include esters of titanium dioxide, e.g., an organic orthoester.

Examples of silicates include metal silicates, preferably alkali metal silicates. An example of a metal silicate is potassium silicate, e.g., the potassium salt of silicic acid, or sodium silicate or a sodium salt of silicic acid, e.g., SILICATE STAR™ from PG Corporation, Forge Valley, Pa. Other applicable silicates include metasilicates, e.g., sodium metasilicate sold under the name UNIFLO™ (Oxychem Chemical Co.) and orthosilicates. Examples of titanates include titanium alkoxides, titanium alkanedionates, titanium lactates, titanium aminoalkoxides, and combinations thereof. Examples suitable titanium alkoxides include titanium (IV) ethoxide and the TYZOR™ line of titanates from DuPont Chemical Co. Solubilized zinc oxide, aluminates, and carbonates also can be used.

A zinc oxide solution can be prepared by dissolving zinc oxide powder in an alkaline solution, e.g., ammonia or sodium hydroxide solution. A solubilized form of zinc oxide is commercially available from S.C. Johnson, as zinc oxide solution #1. A solubilized aluminum oxide can be prepared by dissolving aluminum oxide or hydroxide in an alkaline solution, preferably in an excess of alkaline solution, for example, ammonium hydroxide or sodium hydroxide solution. An aluminate solution is obtained.

In another embodiment, the coating composition comprises a carrier and a heat responsive organic resin in solution. Examples of suitable organic resins include carboxylated polymers such as resins having a carboxyl group or a salt thereof, and resins having derivatives of carboxyl groups, particularly thermally unstable protecting groups or derivatives such as esters, amides, imides, anhydrides, halides, azides, and carbamates. Ammonium salts are preferred. An example of a thermally unstable protecting group is an alkyl ester having a beta-hydrogen. Such an alkyl ester can undergo, for example, a hydro-acyloxy elimination when heated. Additional examples of organic resins include polysaccharides.

Examples of carboxylic acid polymers or resins include acrylic acid polymers, optionally with thermally unstable protecting groups. The carboxylated resin or the carboxylic acid polymer is selected from the group consisting of polyacrylic acid, salts of polyacrylic acid, acrylic acid copolymers, salts of acrylic acid copolymers, carboxylic acid polymers with thermally unstable protecting groups, polymers of acrylic acid derivatives, and acrylic acid derivative copolymers, and combinations thereof.

Particular examples of carboxylated polymers include acrylic resins such as polyacrylic acid or a salt thereof, e.g., JONCRYL™ 61, and copolymers comprising acrylic acid and a polymerizable monomer such as copolymers of styrene and acrylic acid, e.g., JONCRYL 74, an acrylic acid/styrene copolymer. JONCRYL resins are available from S.C. Johnson & Son, Inc., Racine, Wis.

A water soluble resin is preferred relative to a solvent soluble resin in view of environmental concerns. Water soluble resins are particularly suitable for providing a coating by water flexography. Resins that are not water soluble but are soluble in a mixed solvent containing water can also be used. An example of a solvent soluble resin is ETHOCEL™, which is an ethyl cellulose resin available from Dow Chemical Co. in Midland, Mich. ETHOCEL is soluble in lower alcohols, e.g., ethanol.

The organic resin can be of any suitable molecular weight. For example, the weight average molecular weight of the organic resin can be from about 200 to about 2,000,000 or more; preferably from about 500 to about 2,000,000; and more preferably from about 1,000 to about 1,500,000. The organic resin can be monodisperse or polydisperse.

Any of the heat responsive organic resins in accordance with the present invention can act as a binder resin also. Binder resins serve to, inter alia, hold the components of the coating or improve the durability of the coating. The coating composition can further include a binder resin which may or may not be heat responsive. Any suitable binder resins known in the art can be used, for example, acrylics, diallyl phthalate resins, epoxy resins, alkyds, amino resins, vinyl acetate resins, polystyrenic resins, polyurethane resins, polyamide resins, nitrile resins, vinyl butyral resins, vinyl alcohol resins, aldehyde resins, ketone resins, polyesters, vinyl pyrrolidone resins, cellulosic resins, phenolic resins, furan resins, and the like. The resins can be anionic, cationic, or neutral. Examples of cationic resins include poly (allylammonium chloride) from Aldrich Chemical Company (Milwaukee, Wis.). Examples of neutral resins include poly (vinylpyrrolidone) and copolymers of vinylpyrrolidone, polyvinylalcohol and copolymers containing vinyl alcohol as repeat units, polyvinylether and copolymers of vinyl ether, hydroxypropylcellulose, hydroxyethylcellulose, methyl cellulose, and other resins such as polyester-based, polyamide-based, polyurethane-based, or fluorine-based resins.

In still another embodiment, the coating composition of the present invention comprises a heat responsive colloidal material, for example, a colloidal inorganic compound. Examples of suitable colloidal inorganic compounds include inorganic oxides such as an oxide of silicon, aluminum, cerium, tin, yttrium, zirconium, antimony, or a combination thereof. Examples of suitable colloidal oxides include silica, alumina, ceria, tin (IV) oxide, yttria, zirconia, antimony pentoxide, or a combination thereof.

Other examples of inorganic compounds include silicas such as silica gels, e.g., colloidal silica gel dispersions such as a dispersion in a glycol ether. The silica dispersion can be prepared by dispersing silica gel, e.g., AEROSIL™ 2000 (Degussa Corp. in NJ) in an alkaline solution. A colloidal silica is preferred because of the stability of the composition. The colloidal stability translates to ease of manufacturing operation. The colloidal dispersion of silica can be prepared in any solvents miscible with a solvent of the organic resin. Examples of solvents suitable for preparing the dispersion include polar protic solvents such as water, inorganic acids, alcohols, and polyols such as ethylene glycol; and polar aprotic solvents like N-methylpyrrolidone, methyl carbitol, and alkylated glycol ethers like the DOWANOL™s available from Dow Chemical Co. in Midland, Mich.

The content of colloidal inorganic compound can be about 0.5% by weight or higher, e.g., from about 0.5% to about 99%, and more preferably from about 10% to about 90% by weight. The size of the colloidal particle can be from about 1 nm to about 1000 nm, and preferably from about 1 nm to about 50 nm. The colloidal inorganic compound can be neutral, cationic, or preferably anionic.

Advantageously, the heating composition comprising a colloidal material includes an organic resin. The coating composition is colorless or transparent and produces a colorless or transparent coating. Any suitable organic resin can be used in combination with the colloidal material. The organic resin can be a heat responsive material.

An example of a suitable organic resin that can be used in combination with a colloidal material is a styrene/acrylic copolymer such as poly(acrylic acid-styrene) polymer, e.g., JONCRYL 91 resin from S.C. Johnson. Thus, for example, the coating composition can include a styrene/acrylic copolymer and a silica, e.g., a dispersion of silica or colloidal silica in water. This embodiment of the coating composition is particularly useful in the marking of porous surfaces like paper of all porosity, corrugated cardboard, wood, and leather, or hydrophobic non-porous surfaces such as plastics. The coating has one or more advantageous properties such as water resistance and scratch resistance. The organic resin can be mixed in any suitable proportion with the colloidal material.

The poly(acrylic acid-styrene) resin can be in the form of a salt of suitable cation, preferably a univalent cation such as ammonium, sodium, potassium or others. The ratio of styrene to acrylic acid in the polymer is preferably about 0.1 or more, and more preferably about 10 or more. The organic resin preferably has at least some solubility in water, for example, a solubility of about 0.01% or more, preferably a solubility of about 0.1% or more. Other heat responsive organic resins contemplated for use in the coating of the present invention include acidic resins containing sulfonic acid, phosphonic acid, phosphoric acid, or other anionic groups, and salts thereof.

Cationic and neutral resins also can be used. Examples of cationic resins include poly(allylammonium chloride) from Aldrich Chemical Company (Milwaukee, Wis.). Examples of neutral polymers include poly(vinylpyrrolidone) and copolymers of vinylpyrrolidone, polyvinylalcohol and copolymers containing vinyl alcohol as repeat units, polyvinylether and copolymers of vinyl ether, hydroxypropylcellulose, hydroxyethylcellulose, methyl cellulose, and other resins such as polyester-based, polyamide-based, polyurethane-based, or fluorine-based resins.

The coating can include more than one, e.g., two, three, or more heat responsive materials. If a mixture of heat responsive materials were used, the materials are preferably compatible with one another. The compatibility can improve and/or contribute to the clarity or transparency of the coating. Further, the combination of two or more heat responsive materials may be beneficial, e.g., to improve the water resistance or scratch resistance of the coating. The two or more heat responsive materials can be independently organic, inorganic, or combinations thereof.

The coating of the present invention can contain the heat responsive material in any suitable proportion. The heat responsive material is present typically in an amount of from about 0.1% to about 100%, preferably in an amount of from about 10% to about 90%, and more preferably in an amount of from about 20% to about 80%, by weight of the coating. The content of the inorganic compound or the organic resin can be from about 0.1 to about 99%, and preferably from about 1 to about 50% by weight of the coating composition.

The transparent or colorless coating of the present invention is free or substantially free of a colorant. In certain embodiments, a small quantity, e.g., below about 20% by weight and preferably below about 5% by weight, of colorants such as pigments, dyes, or fluorescent or optical brighteners can be included, e.g., to increase contrast. In addition, sensitizers can be included to enhance image formation.

The heat responsive material can be dissolved or dispersed in a suitable solvent, and the resulting coating composition can be applied to the substrate as a thin film. The transparent coating can be applied to the substrate by any suitable method, e.g., by using conventional printing technologies such as silk-screen printing, flexography, offset printing, dip coating, wire-bar coating, or spray coating, and preferably by flexography.

Flexography is generally carried out by the use of an elastomeric printing plate, a coating compositions, preferably a fast drying coating composition, and an anilox roll coating composition-metering system. The flexographic coating process generally involves a fountain pan that supplies the coating composition to a rubber fountain roll, which in turn supplies the coating composition to the anilox roll. A doctor blade removes the excess coating composition from the surface of the anilox roll so that it transfers a uniform layer of coating composition to the printing plate. The printing plate then transfers the layer of coating composition to the substrate. The substrate is typically supported by an impression roll. See, e.g., "Printing Processes", *Kirk-Othmer Encyclopedia of Chemical Technology,* 20, pp. 101–105 (1996), which is incorporated herein by reference. Water-flexography is a further preferred method of applying the coating composition.

The coating composition of the present invention includes a carrier. Any suitable carrier can be used. The carrier can be organic or aqueous. Aqueous carriers are preferred for environmental reasons. Water is a preferred carrier. Examples of organic carriers include solvents such as alcohols, ketones, esters, is ethers, amides, and combinations thereof. Low boiling solvents such as lower alcohols, lower ketones, and lower esters are preferred. Examples of such solvents include ethanol, acetone, and MEK. Oils can also be used as a carrier.

The coating composition can be prepared by any suitable method. For example, the heat responsive material can be dissolved or dispersed in the carrier to prepare the coating composition. High concentrations of the heat responsive material are preferred. The concentration of the heat responsive material can approach 100% by weight, and is typically up to about 90% by weight, preferably from about 1% to about 80% by weight, and more preferably from about 10% to about 80% by weight of the coating composition.

The heat responsive material can also be made in situ, for example, from precursors. Thus, e.g., precursors of inorganic materials can be made in situ by coating a composition comprising a titanate or orthosilicate. A coating of organic heat responsive material can be prepared by coating a composition comprising a precursor of the organic resin. For example, a composition comprising a monomer or a mixture of monomers can be applied, the resulting coating can be advanced by suitable methods, e.g., by free radical or radiation induced polymerization. Crosslinking agents such as multifunctional acrylates can be optionally used in addition to monofunctional monomers such as styrene and acrylic acid.

The coating composition can advantageously include one or more additives, e.g., additives that improve the stability of the composition and/or the properties of the coating or the mark produced therefrom. For example, the additives can increase the adhesion of the coating to the substrate, modify the surface tension of the composition to promote wetting of the substrate, and/or improve environmental resistance of the coating or the mark such as resistance to hot or cold water or water vapor. Thus, the coating composition can include an adhesion promoter, a defoamer, a crosslinking agent, a plasticizer, a humectant, a pH adjuster, a biocide, a co-solvent, a surface tension modifier, or a combination thereof. Preferably, one or more of these additives are compatible with the heat responsive material.

Any suitable adhesion promoter can be employed. Examples of adhesion promoters include silanes and titanates. Examples of silanes include halosilanes and, preferably, alkoxysilanes. Examples of suitable alkoxysilanes include gamma-glycidoxypropyltrimethoxy silane, which is available as Silane A-187 from OSI Specialties Group, Tarrytown, N.Y., and Silane Z-6020, which is N-(beta-aminoethyl)-gamma-aminopropyltrimethoxysilane from Dow Corning Chemical Co., Midland, Mich.

Examples of suitable titanates include titanium alkoxides, titanium aminoalkoxides, titanium alkoxide alkanedionates, and titanium ammonium lactates, and preferably titanium alkoxides and titanium aminoalkoxides. A preferred titanate is titanium (IV) ethoxide.

The coating composition can include the adhesion promoter in any suitable amount. The adhesion promoter is used in an amount of typically up to about 20% by weight, preferably from 0.01% to about 100% by weight, and more preferably from about 0.01% to about 3% by weight of the composition.

Any suitable crosslinking agent can be used as the crosslinking agent. A preferred crosslinking agent comprises a polyfunctional silane such as a siloxy compound. An example of a siloxy crosslinking agent is tris(gamma-trimethoxypropyl)-isocyanurate, available as Y11597 from Witco Chemicals. Any suitable plasticizer can be used. An example of a plasticizer is SANTICIZER™ 8, which is toluene-(o,p)-ethylsulfonamide, from Monsanto Co. in St. Louis, Mo.

The surface tension modifier, the cross-linking agent, or the plasticizer can be present in any suitable amount, each typically in an amount of up to about 20% by weight, preferably from 0.01% to about 10% by weight, and more preferably from about 0.01% to about 3% by weight of the coating composition.

The surface tension modifier, e.g., surfactants and/or wetting agents, can be included in the coating composition to control wetting of the surface as well as the surface tension of the composition. The surface tension modifier can be ionic, e.g., anionic, or alternatively, non-ionic. Any suitable surfactant or wetting agent can be used.

An example of a suitable surfactant is a silicone based surfactant such as a polyalkyleneoxide modified siloxane, e.g., a polyethyleneoxide modified polydialkylsiloxane. Thus, e.g., SILWET™ L 7600, a polyethyleneoxide modified polydimethylsiloxane from OSI Technology Corporation, Tarrytown, N.Y., can be used. Other examples of suitable surfactants include, but are not limited to, the IGEPAL™ series (Rhone-Poulenc Co.) surfactants; the SURFYNOL™ series (Air Product Co.) surfactants, the TERGITOL™ series (Union Carbide Co.) surfactants; the DUPONOL™ series (E.I. Dupont de Nemours & Co.) surfactants; and the fluoroalkyl series (3M Co.) surfactants; and sodium lauryl sulfate, sodium dodecyl sulfate, and sodium octyl sulfate. The surfactants may be present in the coating composition in an effective amount, generally up to about 10% by weight or more, and preferably from about 0.0001% to about 8% or more by weight, and more preferably from about 0.0001% to about 5% by weight or more of the coating composition.

The ability of the coating composition to wet the substrate surface can optionally be controlled by the use of a co-solvent. Co-solvents can assist in the solubilization of one or more components of the coating composition, e.g., the additives. Illustratively, a co-solvent such as butyl cellosolve can be included in the coating composition to assist in the solubilization of a defoamer. In addition, in certain embodiments, for example, where the solvent employed in the coating composition has a high evaporation rate, the co-solvent such as a high boiling co-solvent can act as a humectant.

The co-solvents are preferably compatible with the coating composition and typically have surface tension values less than that of water. Examples of co-solvents include, but are not limited to, hydroxyether derivatives such as glycol ethers such as cellosolves and alkylcellosolves, and propyleneglycol butyl ether, dipropyleneglycol butyl ether, tripropyleneglycol methyl ether, and the like; alkylcarbitols such as hexylcarbitol, butylcarbitol, and the like; polyethyleneglycol ether or polypropyleneglycol ether derivatives, e.g., derivatives wherein one or two hydroxyl group(s) are replaced by a functional group such as alkyl group, e.g., methyl, ethyl, propyl, butyl, pentyl, hexyl, dodecyl, lauryl, stearyl, phenyl, and alkylphenyl. Preferred examples of alkylphenyl groups include octylphenyl and nonylphenyl. Further examples of co-solvents include alkyl and cyclic amide derivatives such as N-alkylpyrrolidones, e.g., N-ethylpyrrolidone and N-hexylpyrrolidone. The co-solvent can be present in the coating composition in a suitable amount, generally up to about 20% by weight or more, preferably from about 0.1 to about 15% or more by weight, and more preferably from about 0.1 to about 10% or more by weight of the coating composition.

During the coating of the substrates, the pH of the coating composition may change, e.g., due to evaporative loss of solvents. To maintain the pH of the coating composition, a pH adjuster, e.g., an acid or a base, can be used. Any suitable pH adjuster can be used. Typically a base is used to adjust the pH, e.g., a base such as ammonium hydroxide, ammonia, or a weak organic base such as amines and amides. Examples of amines include alkylamines such as monoalkylamines, e.g., butylamine; dialkylamines, e.g., diethylamine; and trialkylamines, e.g., triethylamine. Examples of amides include pyrrolidones such as N-methyl pyrrolidone. Cyclic amines also can be used.

Certain embodiments of the coating composition, e.g., those used in spraying or flexography, may include a defoamer. The amount of defoamer is typically less than about 10% by weight, preferably less than about 5% by weight, and more preferably less than about 1% of the coating composition.

Any suitable defoamer can be used. Examples of defoamers include, but are not limited to, acetylenic-based diols, e.g., the SURFYNOL™ series diols, e.g., SURFYNOL 420, 440, 480, DF-37, and DF-110D, from Air Product & Chemical Co.(Allentown, Pa.); water-based siliconic defoamers such as XRM™-3588 (Ultra Additives, Paterson, N.J.); ANTIFOAM™ 1510-US and FG™-10 from Dow Corning (Midland, Mich.); SAG™ 2001 from Union Carbide (Danbury, Conn.); BYK™-022, BYK-024, and BYK-088 from BYK Additives (Wallingford, Conn.)); DF-58, DF-574, DF-695, and DF-210 from Air Products & Chemical Co.; or organo-based defoamers such as SURFYNOL DF-70, DF-75, and DF-210, also from Air Products & Chemical Co.

Embodiments of the coating composition or the coating preferably include an energy transfer agent. The energy transfer agent serves to improve the conversion to heat of the energy supplied during the marking. An example of the energy transfer agent is fumed silica such as AEROSIL 2000.

The additives discussed above can impact more than one property of the coating composition. Thus, for example, a surface tension modifier can also act as a co-solvent. Conversely, the co-solvent can act also as a surface tension modifier. The co-solvent can also act as a humectant.

The present invention further provides a method for creating a mark on a substrate comprising coating the substrate with the transparent coating as described above to obtain a coated substrate and exposing a selected area of the coated substrate to heat in order to create the mark.

An advantage of the present invention is that the coating can be very thin. The thin coating can provide marks with good contrast. Thus, for example, the wet coating thickness can be typically less than about 1,000 $\mu$m, e.g., less than about 500 $\mu$m, preferably from about 1 $\mu$m to about 100 $\mu$m, and more preferably from about 1 $\mu$m to about 25 $\mu$m. The dry film thickness can be typically less than about 1000 $\mu$m, e.g., less than about 500 $\mu$m, preferably from about 0.1 $\mu$m to about 100 $\mu$m, and more preferably from about 0.1 $\mu$m to about 25 $\mu$m. Prior to writing on the coating, the coating is preferably dried to remove the solvent. The coating can comprise any number of layers, and preferably, one layer.

Optionally, the coating can be subjected to pre-curing. Pre-curing facilitates high speed laser writing. In addition, pre-curing can improve the resistance of the coding to water, solvents, and/or heat. Pre-curing involves slow heating of the coating at a temperature of about 100 to about 140° C., for a period of from about one to five minutes. This slow heating removes the excess water. As rapid heating can lead to blistering of the coating, the heating is preferably slow. The coating is heated to a temperature of from about 200° C. to about 240° C., for a period of from about 0.5 minute to about 10 minutes. During the latter heating, most of the water, e.g., most of the physically adsorbed water, is removed. Embodiments of the coating, particularly coatings having a thickness of less than about 10 $\mu$m, can be heated to a higher temperature, e.g., higher than 240° C., typically from about 400° C. to about 440° C., for a short period of time, e.g., from about 0.2 to about 1 minute, preferably about 0.5 minute.

The coated substrates can be marked with any suitable source of heat, e.g., laser, thermal printhead, thermal stylus, heat pen, infrared lamp, an oven, or a microwave energy based heater. For example, a focused microwave set at the vibrational frequency of water can be used to write on the coating.

Laser is a preferred source of heat. Any suitable laser can be used, for example, a $CO_2$ laser or a YAG laser. Another advantage of the method of the present invention is that substrates to be marked or coded can be advanced to the laser beam at high rates, for example, at about 50 feet/minute or more, preferably from about 50 feet/minute to about 1000 feet/minute or more, and more preferably from about 50 feet/minute to about 300 feet/minute. The maximum marking speed is generally determined by the readability of the marks produced. The maximum marking or coding speed can be determined, for example, by the highest speed at which a mark having a L* value more than about 25 is produced. The L* value is based on the CIELab* color scale, and increasing L* value indicates increasing whiteness.

Any suitable amount of energy can be used to create the mark. For example, the laser energy delivered to the coating can be up to 200 $kJ/cm^2.sec$, and is typically from about 0.2 $J/cm^2.sec$ to about 150 $kJ/cm^2.sec$, preferably from about 1 $J/cm^2.sec$ to about 150 $kJ/cm^2.sec$, and more preferably from about 15 $J/cm^2.sec$ to about 150 $kJ/cm^2.sec$.

Still another advantage of the method of marking in accordance with the present invention is that marks with good contrast can be produced at relatively short laser exposure times. For example, dot time is defined as the time of residence of the laser beam on a spot on the substrate to form a spot or dot. The shorter the dot time, the greater the marking speed. The dot time can be less than about 762 $\mu$sec, typically less than about 300 $\mu$sec, preferably from about 1 $\mu$sec to about 300 $\mu$sec, and more preferably from about 1 $\mu$sec to about 150 $\mu$sec. Marking can be effected by forming a pattern of spots or dots, i.e., "dot matrix" marking or a continuum of spots or dots on a substrate, i.e., "steered beam" marking.

Different types of marks or codes can be generated by lasers in accordance with the present invention. Thus, numerals, letters, symbols, and graphics can be produced and the codes can be of different dimensions such as one-dimensional bar codes and two-dimensional machine readable codes. The latter is sometimes known as a SNOWFLAKE™ code.

The present invention provides a coating composition that can provide thermochromic coating on a variety of substrates. The coating is responsive to low energy lasers and produces white markings with sufficient contrast ratio.

The transparent coating of the present invention can be applied to a variety of substrates for heat or laser marking. Suitable substrates include corrugated paper, color coated paper, metals, plastics, ceramics, glass, wood, and rubber. An example of a suitable plastic substrate is a PET bottle.

The transparent coating of the present invention can be suitably protected from environmental damage, abrasion, and wear. For example, the transparent coating of the present invention can be covered by a water or oil resistant coating for increased durability.

Embodiments of the invention include a coating suitable for marking with heat wherein the mark thus produced contains microvoids, bubbles, crosslinks and/or fine particulates. It is believed, in certain embodiments, that the heat responsive material becomes opaque as a result of a chemical reaction that occurs when exposed to heat. For example, the chemical reaction can include decomposition, desolvation, polymerization, crosslinking, oxidation, and/or reduction. A preferred chemical reaction is decomposition, e.g., a decomposition that results in the loss of small molecules such as water, ammonia, or carbon dioxide from the heat responsive material. For example, scattering or refraction of light by one or more of these microvoids, bubbles, crosslinks, and fine particulates results in opacity. The heat responsive material can also become opaque as a result of the loss of solvation, e.g., loss of water of solvation.

The following examples further illustrate the present invention, but of course should not be construed in any way as limiting the scope of the invention.

EXAMPLE 1

This Example illustrates a method of providing a coating to a substrate and creating a mark according to an embodiment of the present invention. A 10% solution of HYD-REZ™ 2007 resin, a solid acrylic modified resin produced by Lawter International, Northbrook, Ill., was applied as a wet film of thickness 50 µm onto a glass slide using a film applicator (BYK Gardner, Inc., Silver Spring, Md.). The film was allowed to dry overnight at the ambient temperature (20±3° C.). The film coated glass slide was then exposed to a 100 Watt laser beam (LASERPRO™ DM, Marconi Data Systems Inc., Wood Dale, Ill.) at a writing speed of 50 feet per minute. The dot time for the laser was set at 32 µsec.

EXAMPLES 2–4

These Examples illustrate the preparation of additional coated substrates in accordance with an embodiment of the present invention. A solution of JONCRYL 61 (solids content 35%, Example 2), a solution of JONREZ™ E2050 (solids content 40%, Westvaco, Charleston Heights, S.C., Example 3), or a solution of sodium silicate (SILICATE STAR, solids content 35%, Example 4) was used to coat the slides. The glass slides were dried, and then exposed to a laser as described in Example 1 to produce the marks. A control sample was prepared by coating a glass slide with sodium silicate as in Example 4, except that the slide was not exposed to a laser.

EXAMPLE 5

This Example illustrates certain properties of the marks obtained in Examples 1–4. The marks on the slides were evaluated on a HunterLab MINISCAN™ XE color spectrometer (Hunter Associates, Reston, Va.). During the measurements, the slides were placed on a black paper to provide a black background. The whiteness of the marks was expressed by the L* value. The L* values of the control sample and an uncoated glass slide also were obtained. The results obtained are set forth in Table 1.

TABLE 1

| L* values of laser marks obtained in Examples 1–4 | | |
|---|---|---|
| Example # | System | L* |
| 1 | HYD-REZ 2007/laser | 25.4 |
| 2 | JONCRYL 61/laser | 32.6 |
| 3 | JONREZ E2050/laser | 32.9 |
| 4 | SILICATE STAR/laser | 55.4 |
| — | Control Sample (SILICATE STAR, No laser) | 27.1 |
| — | Glass Slide, No laser | 17.0 |

The L* values set forth in Table 1 are the average of three determinations and show that the coated substrates were suitable for laser marking. Particularly, marks described in Examples 2–4 were readily readable.

EXAMPLE 6

This Example illustrates an advantage of a coating prepared in accordance with an embodiment of the present invention. The coating is markable with a laser with a short dot time.

A 50 µm thick wet film of sodium silicate (SILICATE STAR) aqueous resin solution (38% by weight resin content) containing 1% Silane Z-6020 was applied to a glass slide and the glass slide was dried overnight. The glass slide was then exposed to a 100 W laser at a rate of 50 feet per minute. Three dot time settings were employed for the laser marking. The marks produced were evaluated as set forth in Example 5, and the results obtained are set forth in Table 2. The L* values set forth below are the average of three determinations.

TABLE 2

| L* values of marks formed on a coating comprising a silicate resin and a silane adhesion promoter. | |
|---|---|
| Dot Time (µsec.) | L* |
| 20 | 51.7 |
| 100 | 50.6 |
| 200 | 51.5 |

The foregoing shows that the coating was markable with good contrast even at a short dot time of 20 µsec.

EXAMPLE 7

This Example illustrates another advantage of the coating prepared in accordance with an embodiment of the present invention. The coating can be marked at high speeds.

A 50 µm thick wet film of a 38% sodium silicate (SILICATE STAR) resin aqueous solution containing 1% Silane Z-6020 was applied to glass slides and the resulting films on the glass slides were dried overnight. The glass slides were then exposed to a 100 W laser at the marking speeds of 50, 150, 250, and 350 feet per minute. The dot time for the laser was set at 32 µsec. The marks were evaluated and the results obtained are set forth in Table 3.

TABLE 3

L* values of marks formed at various coding speeds

| Speed (feet per minute) | L* |
| --- | --- |
| 50 | 55.4 |
| 150 | 39.2 |
| 250 | 31.7 |
| 350 | 26.0 |

The foregoing shows that the coating of the present invention can be marked at speeds as high as 350 feet per minute.

EXAMPLES 8a–c

Examples 8a–c illustrate the use of a surface tension modifier, a cross-linker, and a plasticizer, respectively, in the preparation of a coating composition in accordance with an embodiment of the present invention.

Coating compositions were prepared with the following ingredients in the indicated weight percentages:

Ex. 8a: 0.8% Silane Z-6020+77.2% SILICATE STAR (38% sodium silicate solution)+20.3% water+1.7% surface tension modifier SILWET L-7600

Ex. 8b: 1.5% tris (gamma-trimethoxypropyl) isocyanurate—Y11597+75.4% SILICATE STAR+ 23.1% water Ex. 8c: 1% Silane Z-6020+98% SILICATE STAR+1% SANTICIZER 8 (plasticizer, toluene (o,p)-ethyl sulfonamide)

The above compositions were coated onto glass slides according to the procedure described in Example 6. The dried coatings were exposed at writing speeds of up to 400 feet per minute to a 100 Watt laser beam (LASERPRO DM, Marconi Data Systems Inc.), and the marks obtained were readable.

EXAMPLE 9

Figure 2:
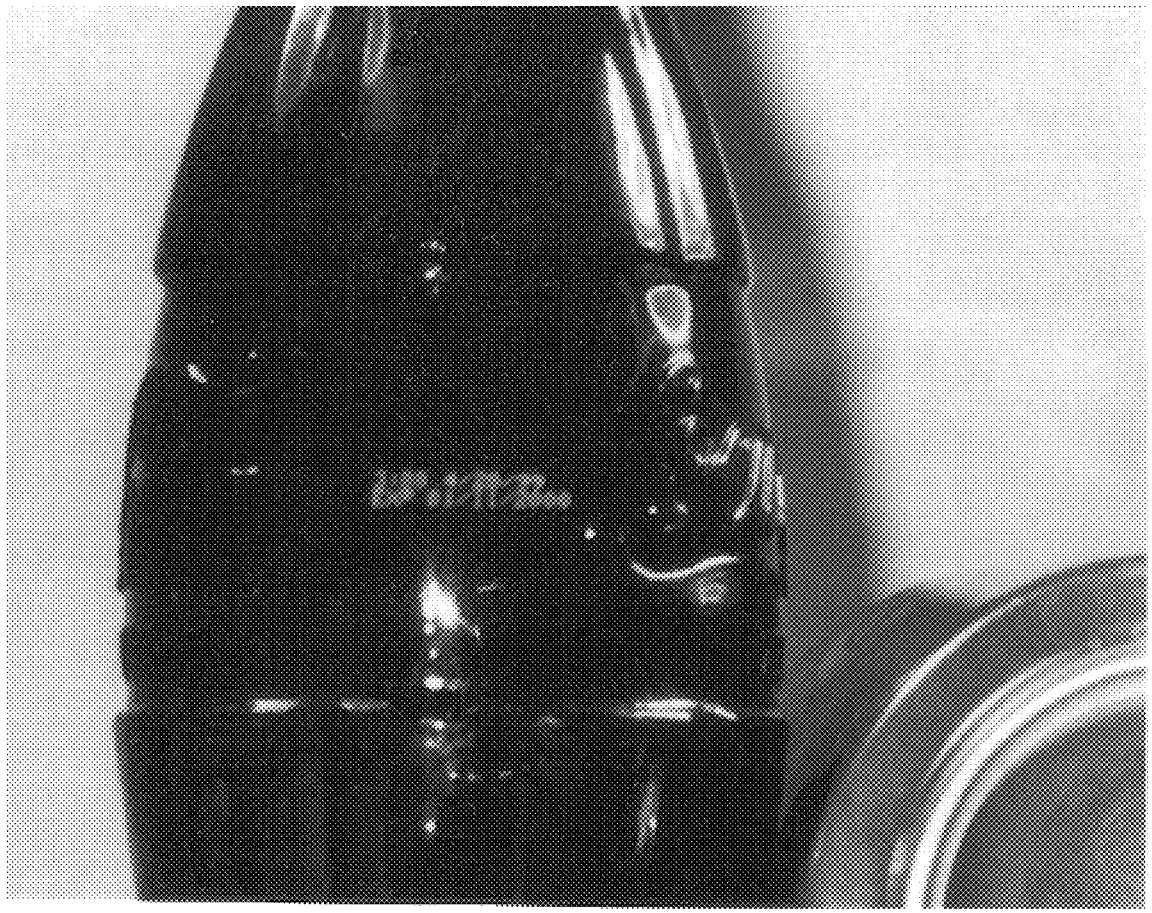
FIG. 2 depicts a laser mark produced on the bottom of an aluminum can in accordance with an embodiment of the present invention. The mark shows the expiration date of the contents of the can.

This Example illustrates the marks produced on glass and metal substrates in accordance with an embodiment of the present invention. Thus, a coating composition containing 1% Silane A-187 in a 38% by weight sodium silicate (SILICATE STAR) aqueous solution was applied as a 50 $\mu$m film onto the side of a glass bottle and the bottom of an aluminum can. The wet film was allowed to dry and the substrates were then exposed to a carbon dioxide laser (100 W) at a coding speed of 50 feet per minute and a dot setting of 32 $\mu$sec. The marks obtained are depicted in FIG. 1 (glass bottle) and FIG. 2 (aluminum can). The marks had good color contrast.

EXAMPLE 10

Examples 10–14 illustrate certain advantages of the coating prepared in accordance with an embodiment of the invention. The coating was laser-markable at good coding speeds, and the marks were resistant to water.

50 grams of JONCRYL 91, 50 grams of colloidal silica (LB 3120, Hi-Mar Specialty Chemical Co., Milwaukee, Wis.), and 50 grams of deionized water were mixed in a plastic beaker for 15 minutes using an electric mixer. A drawdown of the resulting coating solution was made on a corrugated board at a surface coverage of 20 mg (wet weight) per sq. inch. The wet film was allowed to dry overnight. Lines with 15–17 characters at ⅜ inch height were then printed onto the coating using a LASERPRO DM $CO_2$ laser at various coding speeds. The highest coding speed for readable codes was noted.

The code was immersed in ambient temperature water (20±2° C.) overnight for water resistance testing. The quality of the code after the water resistance test was judged visually. Three grades were given: Good, Moderate, or Poor for differentiation of water resistance. "Good" refers to a minimal loss of legibility when compared to an unimmersed sample. "Moderate" refers to a slight loss of legibility. "Poor" signifies total loss of code after the water immersion test.

EXAMPLE 11

This Example illustrates a preparation and properties of another embodiment of the coating of the present invention.

50 grams of JONCRYL 61, 50 grams of Zinc Oxide Solution #1 (S.C. Johnson), and 50 grams of deionized water were mixed in a plastic beaker for 15 minutes using an electric mixer. A drawdown of the resulting solution was made on a corrugated board at a surface coverage of 20 mg (wet weight) per sq. inch. The wet film was allowed to dry overnight. Lines with 15–17 characters at ⅜ inch height were then printed onto the coating using a LASERPRO DM $CO_2$ laser at various speeds. The highest coding speed for readable codes was noted. The code was also immersed in ambient temperature water overnight for water resistance testing. The same grading system was adopted as in Example 10.

EXAMPLE 12

The procedure in Example 10 was followed except that JONCRYL 91 was replaced by JONCRYL 62 to prepare the coating composition.

EXAMPLE 13

The procedure in Example 10 was followed except that a copolymer of vinylpyrrolidone and vinylacetate was used instead of JONCRYL 91 to prepare the coating composition.

EXAMPLE 14

The procedure in Example A was followed except that 4 grams of JONCRYL 98, 6.4 grams of sodium carbonate, and 1.6 grams of deionized water were used to prepare the coating composition.

The coatings were tested for water and scratch resistance, and the results obtained are set forth in Table 4.

TABLE 4

Highest coding speed and water resistance of the coatings prepared in Examples 10–14.

| Example | Highest Coding Speed (feet per minute) | Water Resistance |
| --- | --- | --- |
| 10 | 175 | Good |
| 11 | 150 | Good |
| 12 | 250 | Good |
| 13 | 150 | Poor |
| 14 | 175 | Moderate |

The foregoing shows that the coating of the present invention has water resistance and can be marked at high speeds.

EXAMPLE 15

This Example illustrates the preparation and properties of certain other embodiments of the coating composition of the present invention wherein a colloidal material was employed. Four coating compositions were prepared and tested as follows.

5 grams of colloidal ceria in water or colloidal zirconia (each 20% by weight) were mixed with ten grams of a polyvinylacetate-polyvinylpyrrolidone solution (66% by weight in water) obtained from BASF. 5 grams of colloidal yttria (14% by weight) in water were mixed with ten grams of the polyvinylacetate-polyvinylpyrrolidone solution above. 8.8 grams of colloidal tin oxide (15% by weight) in water were mixed with 11.9 grams of a polystyrene-acrylic resin solution obtained from S.C. Johnson (Racine, Wis.)

The coating compositions prepared as above were coated onto the side of an aluminum can at a wet thickness of about 50 μm. The coatings were dried using a hair-dryer and subjected to laser coding using a 100 W carbon dioxide laser (LASERPRO DM). Good codes were produced at a wide range of line speeds in all of the above coatings.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A coating composition comprising a carrier and a heat responsive inorganic compound in solution, wherein the coating composition is suitable for forming a colorless or transparent layer that becomes white when exposed to heat.

2. The coating composition of claim 1, wherein the heat responsive inorganic compound comprises an element of groups 2b, 3a, and 4a–b of the periodic table.

3. The coating composition of claim 2, wherein the element is silicon, zinc, aluminum, or titanium.

4. The coating composition of claim 3, wherein the heat responsive inorganic compound comprises an oxide.

5. The coating composition of claim 3, wherein the heat responsive inorganic compound is a silicate, zincate, aluminate, or titanate.

6. The coating composition of claim 5, wherein the silicate is a water-soluble silicate.

7. The coating composition of claim 5, wherein the zincate is a water-soluble basic zincate.

8. The coating composition of claim 5, wherein the aluminate is a water-soluble basic aluminate.

9. The coating composition of claim 5, wherein the titanate is a solvent-soluble titanate.

10. A coating composition comprising a carrier and a heat responsive material in solution, wherein the heat responsive material is an ester of titanium dioxide, wherein the coating composition is suitable for forming a colorless or transparent layer that becomes white when exposed to heat.

11. The coating composition of claim 10, wherein the ester is an organic orthoester.

12. The coating composition of claim 1, wherein the carrier comprises water.

13. The coating composition of claim 1, wherein the carrier comprises one or more organic solvents.

14. The coating composition of claim 13, wherein the organic solvents are selected from the group consisting of low boiling alcohols, ketones, esters, ethers, nitrites, and combinations thereof.

15. The coating composition of claim 13, wherein the organic solvent includes an oil.

16. The coating composition of claim 1, wherein the carrier comprises water and one or more organic solvents.

17. The coating composition of claim 1, further including a binder resin.

18. The coating composition of claim 17, wherein the binder resin is a heat responsive binder resin.

19. The coating composition of claim 1, further including a colorant.

20. The coating composition of claim 19, wherein the colorant is a dye, a pigment, or a combination thereof.

21. The coating composition of claim 19, wherein the colorant is present in an amount of about 20% or less by weight of the coating composition.

22. The coating composition of claim 1, further including an adhesion promoter, a defoamer, a crosslinking agent, a plasticizer, a humectant, a pH adjuster, a biocide, a co-solvent, a surface tension modifier, or a combination thereof.

23. The coating composition of claim 22, wherein the adhesion promoter comprises a silane.

24. The coating composition of claim 22, wherein the defoamer comprises a silicone based defoamer.

25. The coating composition of claim 22, wherein the defoamer comprises an acetylenic diol.

26. The coating composition of claim 22, wherein the crosslinking agent comprises a silicon compound.

27. The coating composition of claim 22, wherein the humectant comprises an alkoxylated polyethylene oxide.

28. The coating composition of claim 22, wherein the co-solvent comprises butyl cellosolve.

29. The coating composition of claim 22, wherein the pH adjuster comprises ammonia or an amine.

30. The coating composition of claim 22, wherein the pH adjuster includes ammonium hydroxide, a mono-, di- or tri-alkyl amine, or a cyclic amine.

31. The coating composition of claim 22, wherein the surface tension modifier comprises a non-ionic surfactant.

32. The coating composition of claim 1, which includes two or more heat responsive inorganic compounds in solution.

33. A coating composition comprising a carrier and a heat responsive organic resin, wherein the coating composition is suitable for forming a colorless or transparent layer that becomes white when exposed to heat.

34. The coating composition of claim 33, wherein the heat responsive organic resin comprises a carboxylated resin.

35. The coating composition of claim 34, wherein the carboxylated resin is selected from the group consisting of polyacrylic acid, salts of polyacrylic acid, acrylic acid copolymers, salts of acrylic acid copolymers, carboxylic acid polymers with thermally unstable protecting groups, polymers of acrylic acid derivatives, and acrylic acid derivative copolymers, and combinations thereof.

36. The coating composition of claim 33, further including a colloidal inorganic oxide.

37. The coating composition of claim 36, wherein the colloidal inorganic oxide comprises an oxide of silicon, aluminum, cerium, tin, yttrium, zirconium, antimony, or a combination thereof.

38. The coating composition of claim 36, wherein the colloidal inorganic oxide comprises silica, alumina, ceria, tin (IV) oxide, yttria, zirconia, antimony pentoxide, or a combination thereof.

39. The coating composition of claim 33, wherein the carrier comprises water.

40. The coating composition of claim 33, wherein the carrier comprises one or more organic solvents.

41. The coating composition of claim 33, further including a binder resin.

42. The coating composition of claim 33, further including an adhesion promoter, a defoamer, a crosslinking agent, a plasticizer, a humectant, a pH adjuster, a biocide, a co-solvent, a surface tension modifier, or a combination thereof.

43. The coating composition of claim 33, which includes two or more heat responsive organic resins.

44. A coating consisting essentially of a heat responsive inorganic compound wherein the coating is clear or transparent and becomes white when exposed to heat.

45. A coating comprising a heat responsive material, wherein the coating is clear or transparent, the coating's transparency is independent of the refractive index of the heat responsive material, and the coating becomes white when exposed to heat.

46. A coating comprising an inorganic oxide and an organic resin, wherein the coating is clear or transparent and becomes white when exposed to heat.

47. The coating composition of claim 46, wherein the organic resin comprises a heat responsive organic resin.

48. The coating of claim 47, wherein the coating is formed from a composition comprising colloidal inorganic oxide.

49. The coating of claim 48, wherein the inorganic oxide comprises an oxide of silicon, aluminum, cerium, tin, yttrium, zirconium, antimony, or a combination thereof.

50. The coating composition of claim 46, wherein the organic resin comprises a non-heat responsive organic resin.

51. A coated substrate comprising a substrate and the coating of claim 44.

52. A coated substrate comprising a substrate and the coating of claim 46.

53. A method for marking a substrate comprising providing to the substrate the coating of claim 44 to obtain a coated substrate and exposing to heat the coated substrate so as to create a white mark.

54. The method for marking a substrate of claim 53, wherein the coating includes a silicate, zincate, aluminate, or titanate, to obtain a coated substrate and exposing to heat the coated substrate so as to create a white mark.

55. A method for marking a substrate comprising providing to the substrate the coating of claim 46 to obtain a coated substrate and exposing to heat the coated substrate so as to create a white mark.

56. The method of claim 53, wherein the heat is provided by a thermal printhead, a thermal stylus, a heat pen, an infrared lamp, a microwave energy based heater, or an oven.

57. The method of claim 53, which includes pre-curing the coated substrate prior to exposing the coated substrate to heat provided by a laser beam.

58. The method of claim 53, wherein the coating is provided by water flexography.

59. A coating composition comprising a carrier and a heat responsive material, wherein the heat responsive material is an ester of titanium dioxide, wherein the coating composition is suitable for forming a colorless or transparent layer that becomes white when exposed to heat.

* * * * *